United States Patent
Ishida et al.

(10) Patent No.: US 8,486,515 B2
(45) Date of Patent: Jul. 16, 2013

(54) COATING AGENT FOR PLASTIC LABEL, AND PLASTIC LABEL

(75) Inventors: Kazuyuki Ishida, Nabari (JP); Akira Shintani, Amagasaki (JP); Akira Miyazaki, Nabari (JP); Suguru Arai, Nabari (JP)

(73) Assignee: Fuji Seal International, Inc., Osaka-shi (JP)

( * ) Notice: Subject to any disclaimer, the term of this patent is extended or adjusted under 35 U.S.C. 154(b) by 749 days.

(21) Appl. No.: 12/087,001

(22) PCT Filed: Dec. 19, 2006

(86) PCT No.: PCT/JP2006/325304
§ 371 (c)(1),
(2), (4) Date: Aug. 24, 2010

(87) PCT Pub. No.: WO2007/074684
PCT Pub. Date: Jul. 5, 2007

(65) Prior Publication Data
US 2010/0310835 A1    Dec. 9, 2010

(30) Foreign Application Priority Data

Dec. 26, 2005 (JP) ................. 2005-372456
Dec. 26, 2005 (JP) ................. 2005-372457

(51) Int. Cl.
*C08L 63/00* (2006.01)
*C08F 2/46* (2006.01)
*B32B 3/10* (2006.01)

(52) U.S. Cl.
USPC ......... 428/195.1; 428/413; 522/170; 523/400

(58) Field of Classification Search
USPC ................ 428/195.1, 413; 522/170; 523/400
See application file for complete search history.

(56) References Cited

U.S. PATENT DOCUMENTS

| 6,207,728 | B1 * | 3/2001 | Sekiguchi et al. .............. 522/83 |
| 2003/0059708 | A1 * | 3/2003 | Yamamura et al. .......... 430/269 |
| 2004/0167315 | A1 * | 8/2004 | Sasa ............................. 528/406 |

FOREIGN PATENT DOCUMENTS

| EP | 0848294 A1 | 6/1998 |
| EP | 1302499 A2 | 4/2003 |
| EP | 1614730 A1 | 1/2006 |
| JP | 11-140279 | 5/1999 |
| JP | 2000-302840 | 10/2000 |
| JP | 2003-306633 A | 10/2003 |
| JP | 2004-035862 | 2/2004 |
| JP | 2004-189823 | 7/2004 |
| JP | 2004-269690 | 9/2004 |
| JP | 2005-112937 | 4/2005 |
| WO | WO-2007/007803 | 1/2007 |

OTHER PUBLICATIONS

International Search Report mailed Mar. 20, 2007, issued on PCT/JP2006/325304.
Supplementary European Search Report dated Aug. 11, 2010, issued on the European Patent Application No. 06834974.5.
Notification of Reasons for Refusal from the Japan Patent Office mail dated Jul. 3, 2012 for corresponding application JP2007-551911, and English translation thereof.

* cited by examiner

*Primary Examiner* — Gerard Higgins
*Assistant Examiner* — Sathavaram I Reddy
(74) *Attorney, Agent, or Firm* — Edwards Wildman Palmer LLP; James E. Armstrong, IV

(57) ABSTRACT

Disclosed is a coating composition for a plastic label, which contains an oxetane compound, an epoxy compound, and a cyclic acetal and/or a poly(vinyl butyral). The coating composition excels in suitability for printing such as gravure printing or flexographic printing, cures rapidly to give excellent productivity, and after curing, gives a coating layer that excels in adhesion to a plastic base film and in toughness. A plastic label formed using the coating composition excels in surface scratch resistance and crumpling resistance, and therefore is particularly useful as a label for use in plastic containers, and metal containers such as bottle cans.

15 Claims, No Drawings

COATING AGENT FOR PLASTIC LABEL, AND PLASTIC LABEL

TECHNICAL FIELD

The present invention relates to coating compositions as coating agent for plastic labels, and to plastic labels.

BACKGROUND ART

Currently, plastic bottles such as polyethylene terephthalate (PET) bottles; and metallic bottles such as bottle cans are widely used as containers for beverages such as tea beverages and soft drinks. Plastic labels are often attached to these containers, for indication or for imparting decorativeness and/or functionalities. Of such plastic labels, shrink labels and stretch labels are frequently used, because they have advantages such as good decorativeness, good processability (followability to containers), and large display areas. These labels generally have, on their surfaces, coated or printed layers of inks and other coating compositions, in order to impart decorativeness through characters and designs, and/or to impart functionalities such as scratch resistance and slipperiness.

These coating compositions should have processability suitable for their respective label processing steps such as shrinking process, and cured coating layers therefrom should have such toughness as to avoid deterioration in decorativeness and functionalities due typically to scratches during the course of distribution. In recent years, in the field of shrink films, in particular, demands for improved processabilities such as followability to deformation during shrinking process have been increasingly higher due to increasingly complicated shapes of containers, and the need to provide both high processabilities and high toughness simultaneously has become urgent. In addition, demands have been increasingly growing to impart further functions such as blocking resistance, chemical resistance, thermal stability, and adhesion to base materials.

When these coating compositions are used, for example, as printing inks, gravure printing is generally employed as an application procedure, for excellent print quality (expressivity) of printed matter. Such gravure inks are disadvantageously expensive in cost, because they generally contain large amounts of organic solvents, whereby the solvents evaporated during production processes must be treated, and the treatment requires expensive facilities and high maintenance costs typically for exchange of catalysts. In contrast, water-based inks using no organic solvent suffer from low printing speeds which leads to low productivity, because the water-based inks dry slowly.

To meet these requirements, coating compositions containing epoxy resins as base resins and using substantially no solvent have been developed and improved. Such epoxy resins are relatively brittle, and as a possible solution to this, energy ray-curable compositions further containing an oxetane compound in addition to an epoxy compound for imparting flexibility to the epoxy resin (refer typically to Patent Document 1) are known as coating compositions. In the technique disclosed in this document, only basic properties such as viscosity of the composition and tensile strength of the cured article (cured resin) are considered, but properties in practical use, such as coating processability and followability during shrinking process are never considered. This technique is therefore insufficient to be applied to labels, particularly to shrink labels. In addition, no consideration has been made on functions such as chemical resistance.

In contrast, as solvent-free coating compositions excellent in toughness and adhesion, active energy ray-curable ink compositions containing poly(vinyl acetal)s having ethylenically unsaturated groups (refer typically to Patent Document 2) are known. Photo-curable resin compositions containing a cyclic acetal compound, an epoxy compound, and a photo-induced cationic polymerization initiator (refer typically to Patent Document 3) are also known. These compositions, however, do not sufficiently rapidly cure and have relatively high viscosities, whereby, it is difficult to apply them at higher process speed particularly by gravure printing, thus problems remained in improving the productivity.

[Patent Document 1] Japanese Unexamined Patent Application Publication (JP-A) No. H11-140279
[Patent Document 2] JP-A No. 2004-269690
[Patent Document 3] JP-A No. 2004-35862

DISCLOSURE OF INVENTION

Problems to be Solved by the Invention

Accordingly, an object of the present invention is to provide a coating composition for a plastic label, which has a low viscosity, thereby has excellent suitability for gravure printing and flexographic printing on plastic films, rapidly cures to exhibit excellent productivity, and, after curing, gives a strong coating layer that excels in chemical resistance, scratch resistance, toughness, adhesion to base materials (plastic films), and followability typically in shrinking process. Another object of the present invention is to provide a plastic label that excels in surface chemical resistance, scratch resistance and toughness.

Means for Solving the Problems

After intensive investigations to achieve the above objects, the present inventors have found that incorporation of at least three types of compounds, i.e., an oxetane compound, an epoxy compound, and at least one of a cyclic acetal and a poly(vinyl butyral), gives a coating composition that dramatically rapidly cures, thereby excels in productivity and processing suitability, and gives a satisfactorily tough cured film; and that this configuration also gives a plastic label having the above-mentioned properties. The present invention has been made based on these findings.

Specifically, the present invention provides an active energy ray-curable coating composition for a plastic label, which contains an oxetane compound; an epoxy compound; and at least one of a cyclic acetal and a poly(vinyl butyral).

In another embodiment of the present invention, the weight ratio of the oxetane compound to the epoxy compound is 4:6 to 8:2, and 0.1 to 30 parts by weight of the cyclic acetal is contained to 100 parts by weight of the total amount of the oxetane compound and the epoxy compound.

In yet another embodiment of the present invention, the weight ratio of the oxetane compound to the epoxy compound is 2:8 to 8:2, and 0.1 to 30 parts by weight of the poly(vinyl butyral) is contained to 100 parts by weight of the total amount of the oxetane compound and the epoxy compound.

In still another embodiment of the present invention, the coating composition for a plastic label is an ink for gravure printing or flexographic printing.

In another embodiment of the present invention, the cyclic acetal in the coating composition for a plastic label is 1,3-dioxolane or 1,4-dioxane.

In yet another embodiment of the present invention, the coating composition for a plastic label further contains a sensitizer and titanium oxide.

In another embodiment, the plastic label is a shrink label.

The present invention further provides a plastic label which includes a coating layer formed from the coating composition for the plastic label by gravure printing or flexographic printing.

In addition, the present invention provides a plastic label which includes at least one layer, and at least one outermost layer is formed from the coating composition.

Advantages

The coating compositions for plastic labels according to the present invention are satisfactorily applied to plastic films typically by gravure printing, flexographic printing, and the like, can satisfactorily follow the deformation of base films occurring typically as a result of shrinking process, to produce plastic labels with higher efficiency. In addition, cured articles of the compositions excel in scratch resistance, solvent resistance, and adhesion to base materials, whereby plastic labels with coats of the coating compositions according to the present invention are particularly useful as labels for use typically in glass bottles and plastic containers such as PET bottles.

BEST MODE FOR CARRYING OUT THE INVENTION

Coating compositions for plastic labels, and plastic labels, each according to the present invention, will be illustrated in detail below.

The coating compositions for plastic labels according to the present invention essentially contain an oxetane compound (hereinafter referred to as "Component A"); an epoxy compound (hereinafter referred to as "Component B"); and a cyclic acetal and/or a poly(vinyl butyral) (hereinafter referred to as "Component C"). "Component A and Component B" as used herein are defined not to include silicones having an oxetanyl group and/or an epoxy group.

"Component A" used herein refers to a compound having at least one oxetanyl group (oxetane ring) per molecule and may be a monomer or an oligomer. Oxetane compounds described typically in JP-A No. H08-85775 and No. H08-134405 can be used, of which compounds having one or two oxetanyl groups per molecule are preferred. Examples of compounds having one oxetanyl group per molecule include 3-ethyl-3-[(phenoxy)methyl]oxetane, 3-ethyl-3-(hexyloxymethyl)oxetane, 3-ethyl-3-(2-ethylhexyloxymethyl)oxetane, 3-ethyl-3-(hydroxymethyl)oxetane, 3-ethyl-3-(chloromethyl)oxetane, and 3-ethyl-3-(cyclohexyloxymethyl)oxetane. Examples of compounds having two oxetanyl groups per molecule include 1,4-bis[[(3-ethyloxetan-3-yl)methoxy]methyl]benzene and bis[(3-ethyloxetan-3-yl)methyl]ether. Of these compounds, 3-ethyl-3-(hydroxymethyl)oxetane and bis[(3-ethyloxetan-3-yl)methyl]ether are particularly preferred, from the viewpoints of suitability for coating process and curability of the resulting coated layer (resin layer).

Component B for use herein can be any known epoxy compounds having at least one epoxy group per molecule. Examples thereof include aliphatic epoxy compounds, cycloaliphatic epoxy compounds, and aromatic epoxy compounds. Among them, compounds having a glycidyl group and compounds having an epoxycyclohexane ring are preferred, and epoxy compounds having two or more epoxy groups are also preferred, for their satisfactorily high reaction rates. Examples of the aliphatic epoxy compounds include propylene glycol glycidyl ether. Examples of the cycloaliphatic epoxy compounds include 3,4-epoxycyclohexylmethyl-3',4'-epoxycyclohexanecarboxylate and bis-(3,4-epoxycyclohexyl)adipate. Examples of the aromatic epoxy compounds include bisphenol-A glycidyl ether, condensates of bisphenol-A with glycidyl ether, epichlorohydrin-modified novolak resins, and epichlorohydrin-modified cresol resins.

The compounding ratio (weight ratio) of Component A to Component B of the coating compositions of the present invention is preferably 2:8 to 8:2, namely, the ratio [(Component A)/(Component B)] is preferably 0.25 to 4. When the composition is to be applied by gravure printing or flexographic printing, the weight ratio is preferably 4:6 to 8:2, and more preferably 5:5 to 8:2; namely, the ratio [(Component A)/(Component B)] is preferably ⅔ to 4, and more preferably 1 to 4. If the ratio (relative amount) of Component A is larger than the above range, the initiation rate of the cure reaction of the coating composition may be low and the coating composition may cure slowly to lower the productivity, or the composition may remain uncured in a regular cure process. In addition, the coated layer may have insufficient adhesion to base materials. If the relative amount of Component B is larger than the above range, the coating composition may have high viscosity and be difficult to apply uniformly by a coating process such as gravure printing or flexographic printing; and termination of cure reaction may often occur to yield a cured article having a low molecular weight, and the cured coating layer may become brittle.

The total amount of Component A and Component B is preferably 30 to 95 percent by weight based on the total amount of the coating composition, typically for yielding satisfactory coatability and curability. When the coating composition of the present invention is used as a transparent coating composition, the total amount is preferably 60 to 95 percent by weight, and more preferably 70 to 90 percent by weight. When the coating composition is used as a pigmented printing ink, the total amount is preferably 30 to 90 percent by weight, and more preferably 40 to 80 percent by weight.

Component C for use herein is a cyclic acetal and/or a poly(vinyl butyral). Each of the cyclic acetal and the poly (vinyl butyral) can be used alone or in combination.

The "cyclic acetal compound" used herein as Component C refers to a compound represented by following Formula (1):

[Chemical Formula 1]

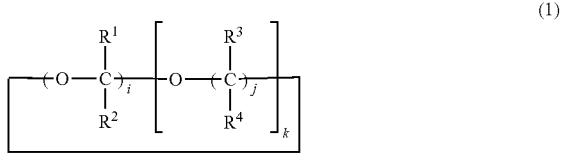

(1)

wherein each of $R^1$, $R^2$, $R^3$, and $R^4$ represents hydrogen atom or a hydrocarbon group having one to eight carbon atoms (for example, a linear or branched hydrocarbon group such as methyl group, ethyl group, propyl group, or isopropyl group), and these groups may be the same as or different from one another; "i" denotes an integer of 1 or more (preferably 1 to 3); "j" denotes an integer of 2 or more (preferably 2 to 4); and "k" denotes an integer of 0 or more (preferably 1 to 3).

Examples of the cyclic acetal compound include trioxane, tetraoxane, 1,3-dioxolane, 1,3,5-trioxepane, 1,3-dioxane, 1,4-dioxane, ethylene glycol formal, diethylene glycol formal, triethylene glycol formal, 1,4-butanediol formal, 1,5-pentanediol formal, and 1,6-hexanediol formal. Among them, 1,3-dioxolane and 1,4-dioxane are preferred, of which 1,3-dioxolane is particularly preferred.

The "poly(vinyl butyral)" used herein as Component C refers to a compound prepared through acetalation by reacting butyraldehyde with a poly(vinyl alcohol) in the presence of an acid catalyst and is a copolymer of vinyl butyral, vinyl acetate, and vinyl alcohol. The poly(vinyl butyral) may also be a modified poly(vinyl butyral) having a repeating unit represented by following Formula (2):

[Chemical Formula 2]

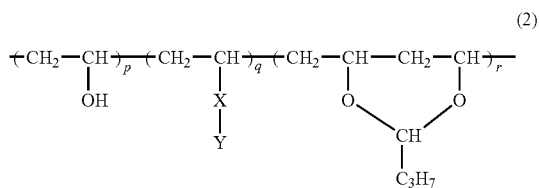

(2)

In Formula (2), X represents an acetal bond, a urethane bond, an ester bond, or an ether bond; Y represents an organic group and includes, but is not limited to, (meth)acryloyl group, vinyl group, allyl group, and styryl group; "p" denotes an integer of 0 or more; each of "q" and "r" independently denotes an integer of 1 or more. The copolymer may be either a block copolymer or a random copolymer.

The degree of acetalation of the poly(vinyl butyral) is not particularly limited but is preferably such that 69 to 88 percent by weight of the original poly(vinyl alcohol) is acetalated, and more preferably such that 70 to 85 percent by weight of the original poly(vinyl alcohol) is acetalated.

The degree of polymerization of the poly(vinyl butyral) is not particularly limited but is preferably 600 to 3000. A poly(vinyl butyral) having a degree of polymerization of less than 600 may not give a coating film having sufficient toughness, and one having a degree of polymerization more than 3000 may have high viscosity and may thereby have insufficient solubility and gravure printability.

Such poly(vinyl butyral)s also include commercially available products, such as "Mowital" supplied from Kuraray Co., Ltd. and "Denka Butyral" supplied from Denki Kagaku Kogyo Kabushiki Kaisha.

The amount of Component C herein is, when applied by gravure or flexographic printing, preferably 0.1 to 60 parts by weight, more preferably 0.1 to 30 parts by weight, further preferably 0.5 to 25 parts by weight, and most preferably 1 to 25 parts by weight, to 100 parts by weight of the total amount of Component A and Component B. If the amount of Component C is less than 0.1 part by weight, addition of Component C may not be so effective and may rather reduce toughness and/or cure rate. In contrast, addition of Component C in an amount exceeding 30 parts by weight may adversely affect curing of Components A and B to cause curing failure. In addition, the resulting coating composition may have an excessively high viscosity and may be difficult to apply uniformly by gravure or flexographic printing, to cause, for example, "poor coverage".

Component A in a coating composition of the present invention gives a tough coating layer having a high molecular weight due to cure reaction being resistant to termination. However, the initiation reaction of Component A is unlikely to proceed and thereby this component cures slowly to give insufficient productivity. Alternatively, if the composition is subjected to cure in a short time, it does not sufficiently cure and gives a coating layer having insufficient toughness. In contrast, Component B in a coating composition of the present invention has the initiation reaction that rapidly proceeds to have an increased production rate; but the cure reaction is likely to terminate, thus the resulting cured article has a low molecular weight and thereby gives a coating layer having insufficient toughness. Although combination use of the two components (preferably in the above-mentioned compounding ratio) will give a cure rate (productivity) and toughness to certain extent, it does not give a coating layer having a sufficient toughness at a high process speed. In contrast, a coating composition according to the present invention further contains a predetermined amount of Component C, in addition to the two components, and thereby dramatically rapidly cures as compared to a composition containing only Component A and Component B. This is probably because of the interaction among the three components, i.e., Components A, B, and C. Accordingly, the coating layer can cure upon application of active energy rays for a short period of time, the process can be carried out at a higher speed, to yield a product with improved productivity, therefore, productivity and toughness at high levels can be obtained simultaneously. Remarkably when Component C is a poly(vinyl butyral), the coating composition shows improved adhesion to base materials. It should be noted that it is difficult to obtain these advantages when a coating composition is a binary system containing Component C in combination with Component A. The composition should be a ternary system. Remarkably when Component C is a cyclic acetal, addition of Component C may allow the coating composition to have a lower viscosity and to have further improved coatability.

A coating composition according to the present invention may further contain a compound having at least one (meth)acryloyl group and at least one vinyl ether group per molecule in order to have an improved cure rate, have a lower viscosity, and thereby have increased workability. The compound is not particularly limited but is preferably any of vinyl ether-containing (meth)acrylic esters. Examples thereof include 2-vinyloxyethyl(meth)acrylates, 3-vinyloxypropyl(meth)acrylates, 1-methyl-2-vinyloxyethyl(meth)acrylates, 2-vinyloxypropyl(meth)acrylates, 4-vinyloxybutyl(meth)acrylates, 4-vinyloxycyclohexyl(meth)acrylates, 5-vinyloxypentyl(meth)acrylates, 6-vinyloxyhexyl(meth)acrylates, 4-vinyloxymerylcyclohexylmethyl(meth)acrylates, p-vinyloxymethylphenylmethyl(meth)acrylates, 2-(2-vinyloxyethoxy)ethyl(meth)acrylates, 2-(vinyloxyethoxyethoxy)ethyl(meth)acrylates, and 2-(vinyloxyethoxyethoxy)ethyl(meth)acrylates. Among them, 2-(2-vinyloxyethoxy)ethyl methacrylate (VEEM) and 2-(2-vinyloxyethoxy)ethyl acrylate (VEEA) are preferred from the viewpoints typically of solubility and curability. These compounds can be, for example, products available as "VEEM" from Nippon Shokubai Corporation.

The amount of compounds having at least one (meth)acryloyl group and at least one vinyl ether group per molecule, if added to the coating composition according to the present invention, is preferably 0.1 to 30 parts by weight, and more preferably 0.5 to 25 parts by weight, to 100 parts by weight of the total amount of Component A and Component B. Addition of these compounds in an amount less than 0.1 part by weight may not effective for reducing the viscosity of the coating composition and/or for improving the cure rate thereof. In contrast, addition of these compounds in an amount exceeding 30 parts by weight may adversely affect the curability of the coating composition, to give a brittle cured article.

A coating composition according to the present invention may further contain a silicone compound (silicone fluid or silicone oil), typically for further higher solvent resistance, slipperiness, and water repellency. As used herein the "silicone compound (silicone fluid)" refers to a polysiloxane having siloxane bonds constituting its principal chain, and may be any of "straight silicone" compounds having no substituent other than methyl group and phenyl group, such as dimethylsilicones, methylphenylsilicones, and methylhydrogensilicones; and modified silicone compounds having a substituent other than methyl group and phenyl group in its side chain or at its terminal.

Among them, modified silicone compounds are preferred from the viewpoints of improving curability and adhesion to base materials. Base silicones of modified silicone compounds can be any polysiloxane having siloxane bonds constituting their principal chain and include, for example, dimethylsilicones which all side chains and terminals are methyl groups; methylphenylsilicones containing phenyl groups as part of side chains; and methylhydrogensilicones containing hydrogen as part of side chains. Among them, preferred are dimethylsilicones. The binding positions of substituents (other than methyl group and phenyl group) in the modified silicone compounds are not particularly limited. For example, the modified silicone compounds may have substituents at both terminals of their principal chain (two-terminal type as represented by following Structural Formula (3)) or at one terminal (one-terminal type as represented by following Structural Formula (4)); or in their side chain (side chain type as represented by following Structural Formula (5)). Examples thereof are represented by following structural formulae. Additionally, the modified silicone compounds may have substituents in their side chain and at terminal or terminals (at two terminals or one terminal).

[Chemical Formula 3]

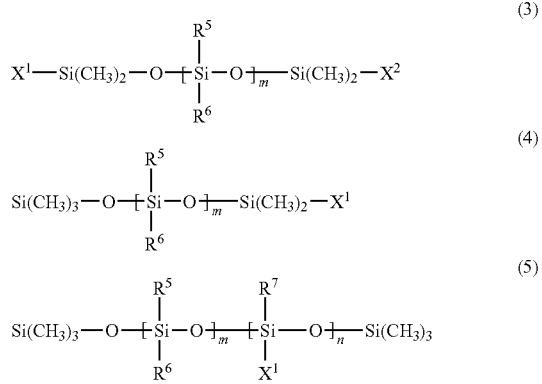

In these formulae, $X^1$ and $X^2$ each independently represents a substituent other than methyl group and phenyl group; $R^5$, $R^6$ and $R^7$ each independently represents hydrogen atom or a hydrocarbon group which may contain oxygen atom, nitrogen atom, and/or sulfur atom, in which these groups are each preferably hydrogen atom, methyl group, or phenyl group, and more preferably methyl group; and "m" and "n" are each an integer of 1 or more.

Examples of the substituents in the modified silicones include epoxy group, fluorine atom, amino group, carboxyl group, aliphatic hydroxyl group (alcoholic hydroxyl group), aromatic hydroxyl group (phenolic hydroxyl group), (meth) acryloyl-containing substituents, and polyether-chain-containing substituents. Examples of modified silicones having these substituents are epoxy-modified silicones, fluorine-modified silicones, amino-modified silicones, (meth)acrylic-modified silicones, polyether-modified silicones, carboxyl-modified silicones, carbinol-modified silicones, phenol-modified silicones, and diol-modified silicones. Among them, typically preferred are epoxy-modified silicones, phenol-modified silicones, fluorine-modified silicones, polyether-modified silicones, and carboxyl-modified silicones.

The silicone compounds may further contain organic groups such as alkyl groups and/or aralkyl groups, in addition to the above listed substituents.

When the silicone compound is an epoxy-modified silicone, the epoxy group as the substituent may be, for example, represented by following structural formulae and may be one in which epoxidic oxygen atom is not constituted by a cycloaliphatic skeleton (left formula; hereinafter referred to as "aliphatic epoxy group") or one in which epoxidic oxygen atom is constituted by a cycloaliphatic skeleton (right formula; hereinafter referred to as "cycloaliphatic epoxy group").

[Chemical Formula 4]

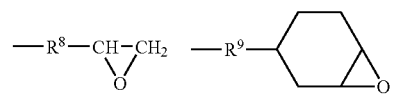

In these formulae, each of $R^8$ and $R^9$ is hydrogen atom or a hydrocarbon group which may contain oxygen atom, nitrogen atom, and/or sulfur atom. Epoxy-modified silicone compounds described typically in JP-A No. H10-259239 can also be used herein.

Among these compounds, dimethylsilicones having epoxy group partially in side chain or as at least one terminal group, are particularly preferred. The weight per functional group (epoxy group) equivalent of the silicone compound is preferably 300 to 5000, and more preferably 400 to 4000, from the viewpoint of curability.

When the silicone compound is a fluorine-modified silicone, the substituent is not particularly limited but is preferably a fluorinated alkyl group such as [—$R^{10}CF_3$], in which $R^{10}$ is a hydrocarbon group which may contain oxygen atom, nitrogen atom, and/or sulfur atom. Examples of the substituent include —$CH_2CH_2CF_3$ and —$C_3H_6CF_3$. The viscosity (23±2° C.) of the fluorine-modified silicone is preferably 100000 mPa·s or less, and more preferably 50000 mPa·s or less. If the viscosity exceeds 100000 mPa·s, the coating composition may have an excessively high viscosity and may not be applied satisfactorily.

When the silicone compound is an amino-modified silicone, the substituent is not particularly limited, as long as it is an amino-containing substituent. Preferred examples thereof are aminoalkyl groups represented typically by [—$R^{11}NH_2$], [—$R^{12}NH$—$R^{13}NH_2$], and [—$R^{14}NHC_6H_{11}$], in which each of $R^{11}$, $R^{12}$, $R^{13}$, and $R^{14}$ is a hydrocarbon group which may contain oxygen atom, nitrogen atom, and/or sulfur atom. Examples of the substituent include —$C_3H_6NH_2$ and —$C_3H_6NHC_6H_{11}$. The viscosity (23±2° C.) of the amino-modified silicone is preferably 100000 mPa·s or less, and more preferably 50000 mPa·s or less. If the viscosity exceeds 100000 mPa·s, the coating composition may have an excessively high viscosity and may not be applied satisfactorily. The weight per functional group equivalent (unit: g/mol) of the amino-modified silicone is preferably 500 or more, for example, 500 to 60000, and more preferably 700 to 60000. If the weight per functional group equivalent is less than 500, a cure reaction may not proceed sufficiently due to cure inhibition. If it is excessively high and exceeds 60000, the advantages of addition of the silicone compound (improvements in adhesion and cure rate) may not be obtained effectively.

When the silicone compound is a (meth)acrylic-modified silicone, the substituent is not particularly limited, as long as it is a (meth)acryloyl-containing substituent. Preferred examples thereof include [—$R^{15}OCOCH=CH_2$] and [—$R^{16}OCOC(CH_3)=CH_2$], in which each of $R^{15}$ and $R^{16}$ is a hydrocarbon group which may contain oxygen atom, nitrogen atom, and/or sulfur atom. Specific examples thereof include —$C_3H_6OCOC(CH_3)=CH_2$ or —$C_3H_6OCOCH=CH_2$. The weight per functional group equivalent (unit: g/mol) of the (meth)acrylic-modified silicone is preferably 20000 or less (for example, 50 to 20000), and more preferably 100 to 15000. If the weight per functional group equivalent exceeds 20000, the advantages of addition of the silicone compound may not be obtained effectively.

When the silicone compound is a polyether-modified silicone, the substituent is not particularly limited, as long as it is a substituent containing two or more repeating units each having ether bond. Preferred examples thereof include organic groups mainly containing an ethylene oxide and/or propylene oxide unit, as represented by [—$R^{17}(C_2H_4O)_aR^{18}$], [—$R^{19}(C_3H_6O)_bR^{20}$], and [—$R^{21}(C_2H_4O)_c(C_3H_6O)_dR^{22}$], in which each of $R^{17}$, $R^{18}$, $R^{19}$, $R^{20}$, $R^{21}$, and $R^{22}$ is a hydrocarbon group; each of "a" and "b" is an integer of about 6 to 30; and each of "c" and "d" is an integer of about 1 to 20. The viscosity (23±2° C.) of the polyether-modified silicone is preferably 100000 mPa·s or less, and more preferably 50000 mPa·s or less. If the viscosity exceeds 100000 mPa·s, the coating composition may have an excessively high viscosity and may not be applied satisfactorily. The HLB (hydrophile-lipophile balance) value of the polyether-modified silicone is not particularly limited but is preferably 0 to 12, and more preferably 0 to 10, from the viewpoint of compatibility (miscibility). If the compound has a HLB value exceeding 12 and is excessively hydrophilic, it may become less compatible (miscible) with other components.

When the silicone compound is a carbinol-modified silicone, the substituent is represented by [—$R^{23}OH$] and includes, for example, —$C_3H_6OC_2H_4OH$ and —$C_3H_6OH$. When the silicone compound is a diol-modified silicone, the substituent is typically preferably an alcoholic diol represented by:

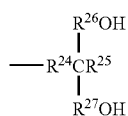

[Chemical Formula 5]

Specific examples thereof include:

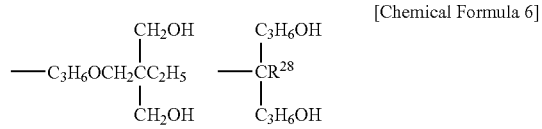

[Chemical Formula 6]

When the silicone compound is a phenol-modified silicone, the substituent is for example, one represented by [—$R^{29}$—$C_6H_4$—OH], in which each of $R^{23}$, $R^{24}$, $R^{25}$, $R^{26}$, $R^{27}$, and $R^{29}$ is an aliphatic hydrocarbon group which may contain oxygen atom, nitrogen atom, and/or sulfur atom; and $R^{28}$ is hydrogen atom, methyl group, ethyl group, or propyl group. Specific examples the substituent include —$C_2H_4$—$C_6H_4$—OH and —$C_3H_6$—$C_6H_4$—OH. The hydroxyl value (unit: mg-KOH/g) of these aliphatic or aromatic hydroxyl-modified silicones is preferably 5 to 150, and more preferably 10 to 140. Addition of an aliphatic or aromatic hydroxyl-modified silicone having a weight per functional group equivalent (hydroxyl value) of less than 5 may not exhibit its advantages typified by satisfactory adhesion. Addition of an aliphatic or aromatic hydroxyl-modified silicone having a weight per functional group equivalent (hydroxyl value) exceeding 150 may inhibit cure, whereby the curing reaction may not proceed sufficiently. The hydroxyl values may be measured in accordance with Japanese Industrial Standards (JIS) K 5601-2-1 but, in particular in the case of phenol-modified silicones, the hydroxyl values may be determined by calculation from weight per functional group equivalents according to the following equation: [Weight per functional group equivalent (g/mol)=56000/(Hydroxyl value) (mg-KOH/g)].

When the silicone compound is a carboxyl-modified silicone, the substituent is not particularly limited, but preferably one represented by [—$R^{30}COOH$], such as —$C_2H_4COOH$ or —$C_3H_6COOH$. In the formula, $R^{30}$ is an aliphatic hydrocarbon group which may contain oxygen atom, nitrogen atom, and/or sulfur atom. The weight per functional group equivalent (unit: g/mol) of the carboxyl-modified silicone is preferably 6000 or less, for example, 500 to 6000, and more preferably 100 to 5000. A carboxyl-modified silicone having a weight per functional group equivalent exceeding 6000 may not exhibit advantages of its addition. The weight per functional group equivalent as used herein refers to the equivalent weight of carboxyl group (COOH moiety).

Commercially available products may also be used as the silicone compounds. Examples of epoxy-modified silicone products include products of Shin-Etsu Silicones under the trade names of "KF-101, KF-102, KF-105, KF-1001, X-22-163A, X-22-163B, X-22-163C, X-22-169AS, X-22-169B, X-22-173DX, and X-22-2000". Examples of fluorine-modified silicone products include those supplied from Shin-Etsu Chemical Co., Ltd. as "FL-5, FL-100-100cs, FL-100-450cs, FL-100-1000cs, FL-100-10000cs, X-22-821, and X-22-822"; and those supplied from Dow Corning Toray Co., Ltd. as "FS1265". Examples of amino-modified silicone products include those supplied from Shin-Etsu Chemical Co., Ltd. as "KF-8005, KF-859, KF-8008, X-22-3820W, KF-857, KF-8001, and KF-861". Examples of (meth)acrylic-modified silicone products include methacrylic-modified silicone products such as those supplied from Shin-Etsu Chemical Co., Ltd. as "X-22-2426, X-22-164A, X-22-164C, X-22-2404, and X-24-8201"; and acrylic-modified silicone products such as those supplied from Shin-Etsu Chemical Co., Ltd. as "X-22-2445 and X-22-1602", and those supplied from Degussa GmbH as "TEGO Rad 2400, 2500, 2600, and 2700". Examples of polyether-modified silicone products include those supplied from Shin-Etsu Chemical Co., Ltd. as "KF-351A, KF-352A, KF-353, KF-354L, KF-355A, KF-615A, KF-945, KF-640, KF-642, KF-643, KF-6020, KF-6004, KF-6011, KF-6012, KF-6015, KF-6017, X-22-6191, X-22-4515, and X-22-2516", and those supplied from Dow Corning Toray Co., Ltd. as "FZ-2110, FZ-2122, FZ-7006, FZ-2166, FZ-2164, FZ-2154, FZ-2191, FZ-7001, FZ-2120, FZ-2130, FZ-720, FZ-7002, FZ-2123, FZ-2104, FZ-77, FZ-2105, FZ-2118, FZ-7604, FZ-2161, FZ-2162, FZ-2203, FZ-2207, FZ-2208, SH-8400, SH-8700, SH-3746, SH-3771, and SF-8491". Examples of carbinol-modified silicone products include those supplied from Shin-Etsu Chemical Co., Ltd. as "X-22-160AS, KF6001, KF6002, KF6003, X-22-4015, X-22-4039, and X-22-170DX". Examples of diol-modified silicone products include those supplied from Shin-Etsu Chemical Co., Ltd. as "X-22-176DX, X-22-176D, and X-22-176F". Examples of phenol-modified silicone products include those supplied from Shin-Etsu Chemical Co., Ltd. as "X-22-1821 and X-22-165B", and those supplied from Dow Corning Toray Co., Ltd. as "BY16-752 and BY16-150S". Examples of carboxyl-modified silicone products include those supplied from Shin-Etsu Chemical Co., Ltd. as "X-22-162C, X-22-3701E, and X-22-3710", and those supplied from Dow Corning Toray Co., Ltd. as "BY16-750 and BY16-880".

The content of the silicone compounds, if added and the composition is applied by coating through gravure or flexographic printing, is preferably 0.1 to 20 parts by weight, more preferably 0.2 to 10 parts by weight, and further preferably 0.3 to 5 parts by weight, to 100 parts by weight of the total amount of Component A and Component B. Addition of silicone compounds in an amount of less than 0.1 parts by weight may not so effective and may rather reduce the solvent resistance, slipperiness, and/or water repellency. In contrast, a coating composition containing silicone compounds in an amount exceeding 20 parts by weight may have an excessively high viscosity and be difficult to apply uniformly by gravure or flexographic printing.

The coating compositions according to the present invention are preferable from the viewpoints of processabilities, because they are curable by the action of active energy rays such as visible rays, ultraviolet rays, and electron beams, and can be suitably applied to shrink films and other base materials that are likely to deform due to heat. Among them, the coating compositions according to the present invention are preferably those curable by the action of ultraviolet rays or near-ultraviolet rays. They preferably absorb rays at wavelengths of 300 to 460 nm.

The coating compositions according to the present invention, if used as active energy ray-curable coating compositions as mentioned above, preferably further contain photo-induced polymerization initiators. Such photo-induced polymerization initiators are not particularly limited but preferably photo-induced cationic polymerization initiators. The photo-induced cationic polymerization initiators for use in the coating compositions according to the present invention include, but are not limited to, diazonium salts, diaryliodonium salts, triarylsulfonium salts, silanol/aluminum complexes, sulfonic acid esters, and imide sulfonates. The content of photo-induced polymerization initiators in the coating composition according to the present invention is not particularly limited but is preferably 0.5 to 7 percent by weight, and more preferably 1 to 5 percent by weight, based on the total amount of the coating composition.

The coating compositions according to the present invention, if used as printing inks, may further contain pigments, dyestuffs, and other additives according to necessity. Typically, the coating compositions preferably contain pigments. Examples of the pigments include white pigments such as titanium oxide (titanium dioxide); cyan (blue) pigments such as copper phthalocyanine blue; red pigments such as condensed azo pigments; yellow pigments such as azo lake pigments; carbon blacks; aluminum flakes; and mica, and they may be as selected and used according to the purpose. Additionally, extender pigments can be used as pigments, typically for adjusting gloss or luster. Examples of such extender pigments include alumina, calcium carbonate, barium sulfate, silica, and acrylic beads. The content of pigments can be freely set according typically to the types of pigments and the target density of color, but is preferably about 0.1 to about 70 percent by weight based on the total amount of the coating composition.

When the coating compositions according to the present invention are used as white printing inks, titanium oxide is preferably used among these pigments. The titanium oxide can be any of rutile (high-temperature tetragonal), anatase (low-temperature tetragonal), and brookite (orthorhombic) titanium oxides. It is also available as commercial products such as titanium oxide particle products supplied from Ishihara Sangyo Kaisha, Ltd. as "TIPAQUE". The average particle diameter of titanium oxide particles is, for example, about 0.01 to about 1 µm, and preferably about 0.1 to about 0.5 µm. When titanium oxide particles form an aggregate, the "average particle diameter" refers to the particle diameter of the aggregate, i.e., secondary particle diameter. Titanium oxide particles having an average particle diameter of less than 0.01 µm may not satisfactorily exhibit masking property. If those having an average particle diameter exceeding 1 µm are used, the resulting film may have a rough surface and may often have deteriorated appearance. The content of titanium oxide in the coating composition, if used as a white printing ink, is preferably 20 to 60 percent by weight, and more preferably 30 to 55 percent by weight, based on the total weight of the coating composition, from the viewpoints of exhibiting masking property of titanium oxide and inhibiting coarse protrusions.

The coating compositions according to the present invention preferably further contain sensitizers according to necessity, for further higher production efficiency. This is particularly effective typically when the titanium oxide pigments are used. The sensitizers for use in this case can be selected from among known sensitizers in consideration typically of the type of active energy rays to be used. Examples of sensitizers include (1) amine sensitizers including aliphatic amines, aromatic amines, and cyclic amines each containing nitrogen atom in the ring, such as piperidine; (2) allyl sensitizers and urea sensitizers such as o-tolylthiourea; (3) sulfur compound sensitizers such as sodium diethyldithiophosphate; (4) anthracene sensitizers; (5) nitrile sensitizers such as N,N-di-substituted p-aminobenzonitrile compounds; (6) phosphorus compound sensitizers such as tri-n-butylphosphine; (7) nitrogen compound sensitizers such as N-nitrosohydroxylamine derivatives and oxazolidine compounds; and (8) chlorine compound sensitizers such as carbon tetrachloride. Among them, anthracene sensitizers are preferred for their high sensitizing activities, of which thioxanthone sensitizers and 9,10-dibutoxyanthracene are more preferred. The content of sensitizers is not particularly limited, but is preferably 0.1 to 5 percent by weight, and particularly preferably 0.3 to 3 percent by weight, based on the total weight of the coating composition.

The coating compositions according to the present invention may further contain lubricants according to necessity. As used herein the "lubricant" refers typically to waxes of every kind, including polyolefin waxes such as polyethylene waxes; fatty acid amides; fatty acid esters; paraffin wax; polytetrafluoroethylene (PTFE) wax; and carnauba wax.

The coating compositions according to the present invention may further contain, for example, dispersants, antioxidants, flavors, deodorants, and stabilizers within ranges not adversely affecting the advantages of the present invention, in addition to the above components.

When the coating compositions according to the present invention contain a solvent which is not involved in reactions and is used mainly as a dispersing agent, the content of the solvent is preferably 5 percent by weight or less, and more preferably 1 percent by weight or less. Most preferably, the compositions contain substantially no solvent. The "solvent" as used herein refers to an organic solvent such as toluene, xylene, methyl ethyl ketone, ethyl acetate, methyl alcohol, and ethyl alcohol; and water, which are generally used typically in inks for gravure printing or flexographic printing to improve coating processability, and compatibility and dispersibility of respective components in the coating compositions. The "solvent" herein is defined not to include reactive diluents to be contained in resin compositions (polymers) after curing. The coating compositions according to the present invention can exhibit excellent coatability and dispersibility among components even in the absence of solvents. This minimizes the amount of a solvent and eliminates the need of removing the solvent. Accordingly, the coating compositions give cured coating layers at higher speeds and lower cost, and place less loads on the environment. In this connection, cyclic acetals for use in the present invention include those of low boiling points, but these components are involved in reactions and do not serve as a dispersing agent. They are taken into the product polymers, do not evaporate, and thereby do not require an extra process of drying.

The viscosity (23±2° C.) of the coating compositions according to the present invention is not particularly limited; but when a coating layer is formed typically by gravure printing, the viscosity is preferably 100 to 2000 mPa·s, and more preferably 200 to 1000 mPa·s. A coating composition having a viscosity exceeding 2000 mPa·s may have insufficient gravure printability, may cause, for example, "poor coverage", and may not impart decorativeness satisfactorily. A coating composition having a viscosity of less than 100 mPa·s may not be satisfactorily stable during storage. The viscosity of the coating compositions can also be controlled typically by using a thickening agent or a thinning agent. As used herein the term "viscosity" means a value measured in accordance with the method specified in JIS Z 8803 using a Brookfield viscometer (single-cylinder rotary viscometer) at 23±2° C. and cylinder revolution number of 60, unless otherwise specified.

The coating compositions according to the present invention are applied preferably by coating through gravure printing or flexographic printing and more preferably through gravure printing, from the viewpoints typically of cost, productivity, and decorativeness of the printed layer.

The coating compositions according to the present invention can be used typically as printing inks for imparting decorativeness; transparent coating agents (slippery medium) for improving slipperiness of surface of labels; and matting coating agents (matt varnishes) for matting labels. Particularly, the coating compositions according to the present invention are preferably used in surface prints, surface media, and other applications where coating layers formed from the coating compositions are arranged as an outermost layer of labels, because excellent scratch resistance and toughness obtained according to the present invention can be most remarkably exhibited in these applications. As used herein the "outermost layer" of a label refers to a surface layer opposite to an adherend such as a container.

The coating compositions according to the present invention may be used for plastic labels. More specifically, they may be used typically for stretch labels, shrink labels, stretch/shrink labels, in-mold labels, tack labels, roll labels (rolled stick-on labels), and heat-sensitive adhesive labels. Among these uses, the coating compositions according to the present invention are particularly preferably used for shrink labels, from the viewpoints of their satisfactory thermal stability, toughness, and followability during processing.

A plastic label according to the present invention has a coating layer formed from the coating composition according to the present invention at least on one surface of a plastic film. The coating layer formed from the coating composition according to the present invention excels typically in scratch resistance and toughness, is thereby preferably arranged as a surface layer of the label, such as an outermost layer or innermost layer, and is more preferably arranged as an outermost layer (surface layer opposite to a side in contact with a container, when applied to the container). Such plastic labels having the coating layer formed according to the present invention as an outermost layer are preferred, because their surface is resistant to scratch, whereby the decorativeness is unlikely to deteriorate during production steps, conveying steps, and uses in market.

The type of plastic films for use in plastic labels according to the present invention can be selected according typically to required properties, use, and cost, and is not particularly limited. Examples of usable plastic films include films of resins such as polyesters, polyolefins, polystyrenes, poly(vinyl chloride)s, polyamides, aramid resins, polyimides, polyphenylenesulfides, and acrylic resins. Among them, preferred are polyester films, polyolefin films, polystyrene films, and poly(vinyl chloride) films, of which polyester films and polyolefin films are more preferred. Material polyesters include, for example, poly(ethylene terephthalate) (PET) and poly(ethylene-2,6-naphthalenedicarboxylate) (PEN). Material polyolefins include, for example, polypropylenes, polyethylenes, and cyclic olefins.

The plastic films may be a single-layer film or a multilayer film including two or more film layers arranged according typically to required properties and use. When the plastic films are multilayer films, they may be multilayer films each including film layers composed of different resins. The multilayer films can be, for example, three-layered films including a central layer and two surface layers (inner layer and outer layer), in which the central layer is composed of a polyolefin resin or a polystyrene resin, and the surface layers are composed of a polyester resin. The plastic films can be any of unoriented films (unstretched films), uniaxially oriented films, and biaxially oriented films, selected according typically to required properties and use. When the plastic labels are shrink labels, the plastic films are often uniaxially or biaxially oriented films, of which generally used are films which have strong orientation in a film width direction (direction to be a circumferential direction of the labels), namely, films which have been substantially uniaxially oriented in a widthwise direction.

The thermal shrinkage (90° C., 10 seconds) of the plastic films is not particularly limited. When the plastic films are used for the preparation of shrink labels, the thermal shrinkage is preferably −3% to 15% in a longitudinal direction and 20% to 80% in a widthwise direction from the viewpoints of its successful shrinking processability.

The thickness of the plastic films may vary depending on the purpose, is not particularly limited, but is preferably 10 to 200 μm. When the plastic films are used for the preparation of shrink labels, for example, the thickness is preferably 20 to 80 μm, and more preferably 30 to 60 μm.

The thickness of the cured coating layers herein may vary depending on the purpose, is not particularly limited, but is preferably 0.1 to 15 μm, and especially preferably 0.5 to 10 μm. A coating layer having a thickness of less than 0.1 μm may not be formed uniformly; and, if used as a print layer, partial "poor coverage (thin spots)", for example, may occur to adversely affect the decorativeness and to make it difficult to conduct printing in exact accordance with the design. In contrast, a coating layer having a thickness exceeding 15 μm may consume large amounts of the coating composition, whereby the cost may be increased, and uniform application may become difficult. In addition, the coating layer may become brittle and susceptible to delamination. In particular, when the coating layer herein is used a white ink layer, the thickness is preferably 3 to 10 μm from the viewpoint of masking property. When the coating layer is used as a transparent coating layer, the thickness is preferably 0.2 to 3 μm from the viewpoint of transparency. It should be noted that the coating layer formed according to the present invention vary little in thickness before and after cure.

Coating layers prepared according to the present invention can be used as a variety of layers such as printing ink layers, topcoat layers, and anchor coat layers and are preferably used in uses where scratch resistance is required. The advantages of the present invention are difficult to exhibit when, for example, the coating layers are sandwiched between and protected by two film layers. In contrast, the coating layers are preferably used as outermost layers such as surface print layers and top coat layers, because they can most significantly exhibit the advantages.

As is described above, the plastic labels according to the present invention can be used typically as stretch labels, shrink labels, stretch/shrink labels, in-mold labels, tack labels, roll labels (rolled stick-on labels), and heat-sensitive adhesive labels, of which shrink labels are most preferred, because the coating layers formed according to the present invention satisfactorily follow deformation during processes such as shrinking process.

The plastic labels according to the present invention are preferably such that the ink does not peel off even after the coating layer surface of the label is rubbed ten times in back-and-forth motion with a cotton swab impregnated with methyl ethyl ketone (herein after referred to as "MEK rubbing test"). A plastic label whose coating layer would be peeled off in the MEK rubbing test may have insufficient decorativeness because of peeling off typically of the print upon use.

The adhesion of the coating layer of a plastic label according to the present invention to a base material is preferably 80% or more, more preferably 90% or more, and further preferably 95% or more. As used herein the "adhesion" refers to a residual rate of the coating layer in a tape peeling test. When the adhesion to base materials is below the above-specified range, the coating layer may be peeled off during processing or distribution to have insufficient properties such as decorativeness. The "adhesion to base materials" is hereinafter also referred to as "adhesiveness".

A plastic label according to the present invention may further include another print layer in addition to the coating layer formed according to the present invention. In this case, the print layer can be formed according to a common printing process such as gravure printing or flexographic printing. A printing ink for use in the formation of the print layer contains, for example, a pigment, a binder resin, and a solvent. Examples of the binder resin include common or regular resins such as acrylic resins, urethane resins, polyamides, vinyl chloride-vinyl acetate copolymers, celluloses, and nitrocelluloses. The print layer other than the coating layer herein is preferably arranged as a layer underlying the coating layer, namely, as a layer nearer to the base film than the coating layer is. An example of this configuration is such that another print layer is arranged adjacent to a base film, and a coating layer according to the present invention containing a white pigment is arranged so as to cover the print layer. The thickness of the print layer is not particularly limited and is, for example, about 0.1 to 10 μm.

A plastic label according to the present invention may further contain one or more other layers in addition to the coating layer formed according to the present invention. Examples of such other layers include anchor coat layers, primer coat layers, layers of unwoven fabrics, and layers of paper.

Plastic labels according to the present invention are generally affixed to containers and are used as labeled containers. Examples of such containers include soft drink bottles such as PET bottles; home-delivered milk containers; containers for foodstuffs such as seasonings; alcoholic drink bottles; containers for pharmaceutical preparations; containers for chemicals such as detergents and aerosols (sprays); and pot noodle containers. Materials for these containers include plastics such as PETs; glass; and metals. Among these containers, the plastic labels according to the present invention are preferably used as labels for soft drink bottles that often receive impact typically in automatic bending machines; and for chemical product containers that are in contact with chemicals, because the coating layer according to the present invention remarkably exhibits its excellent scratch resistance and chemical resistance in these applications. It should be noted, however, that the plastic labels may also be applied to other adherends than containers.

Some embodiments of how coating compositions for plastic labels according to the present invention are prepared, and how plastic labels according to the present invention are prepared will be illustrated below. In the following embodiments, a white printing ink containing titanium oxide and a heat-shrinkable polyester film are illustrated as the coating composition and the plastic film respectively, to prepare a cylindrical shrink label. It should be noted, however, these are illustrated only by way of example, and the ways how the compositions and plastic labels are prepared are not limited thereto.

In the following illustrations, the term "plastic film" refers to an original film after stretching without a coating layer; the term "(long) plastic label" refers to the plastic film bearing a coating layer formed according to the present invention. In the attachment process of the label to a container, the term "long cylindrical plastic label" refers to the long plastic label which has been processed to be cylindrical while leaving it long.

[Preparation of Coating Composition]

Component A for use in the coating compositions according to the present invention can be prepared from an oxetane alcohol and a halide such as xylene dichloride according to a known procedure. The oxetane alcohol may be prepared typically from trimethylolpropane and dimethyl carbonate. Already available compounds may be used as Component A. Examples thereof include commercially available products supplied from Toagosei Co., Ltd. as "ARON OXETANE OXT-101, 121, 211, 221, and 212".

Component B for use in the coating compositions according to the present invention can be those prepared according to common procedures such as synthetic preparation from epichlorohydrin and bisphenol-A. They are also commercially available, for example, from Daicel Chemical Industries, Ltd. as "Celloxide 2021", "Celloxide 2080", and "EPOLEAD GT400", and from The Dow Chemical Company as "UVR-6110".

A cyclic acetal compound for use as Component C in the present invention can be prepared according to a known procedure such as synthesis from a carbonyl compound with diglycerol or ethylene glycol. Already available cyclic acetal compounds are also usable as Component C. Examples thereof include commercially available products supplied from Toho Chemical Industry Co., Ltd. as "1,3-Dioxolane".

A poly(vinyl butyral) for use as Component C in the present invention can be prepared according to a known procedure such as a process of saponifying a poly(vinyl acetate) to yield a poly(vinyl alcohol); and reacting butyraldehyde with the poly(vinyl alcohol) in the presence of an acid catalyst to give a butyral. Already available poly(vinyl butyral)s are also usable as Component C. Examples thereof include those supplied from Kuraray Co., Ltd. as "Mowital" and those supplied from Denki Kagaku Kogyo Kabushiki Kaisha as "Denka Butyral".

Next, obtained Component A, Component B, and Component C are mixed to give a coating composition. Pigments and other additives, if used, are also mixed simultaneously with the above components. The mixing is conducted typically using a mixer, a mill, and/or a kneader. Examples of the mixer include butterfly mixers, planetary mixers, pony mixers, dissolvers, tank mixers, homomixers, and homodispers. Examples of mills include roll mills, sand mills, ball mills, bead mills, and line mills. The mixing duration (residence duration) in the mixing is preferably 10 to 120 minutes. Where necessary, the resulting coating composition may be filtrated before use.

[Preparation of Plastic Film]

A plastic film for use herein can be prepared according to a procedure such as film formation using melting state or film formation using solution; or available as a commercial product such as a polyester film, a polystyrene film, or a polyolefin film.

Typically, the way how a polyester film is prepared by film formation using melting state will be illustrated below.

Initially, a material for the film is polymerized according to a known procedure. A polyester, for example, may be prepared by a process in which terephthalic acid and ethylene glycol as starting materials are subjected to direct esterification to yield a low molecular weight poly(ethylene terephthalate), and this is further subjected to polycondensation by the catalysis typically of antimony trioxide to yield a polymer. Where necessary, another monomer such as 1,4-cyclohexanedimethanol may be copolymerized.

The material thus obtained is extruded from a single-screw or double-screw extruder through a T-die to thereby yield an unoriented film. In this case, an unoriented multilayer film having layers of different kinds can be obtained, for example, through coextrusion.

The unoriented film is generally subjected to drawing (stretching or orientation) to yield a plastic film in some uses. The drawing may be biaxial drawing in a longitudinal direction (machine direction (MD)) and a widthwise direction (transverse direction (TD)) or monoaxial drawing in a longitudinal or widthwise direction. The drawing procedure can be any of drawing using a roll, drawing using a tenter, and drawing using a tube. While varying depending on the type of a polymer to be used, the drawing procedure of a plastic film, if used for the preparation of a shrink label, is often conducted by carrying out drawing at a temperature between the glass transition temperature (Tg) of the polymer and a temperature about 50° C. higher than the glass transition temperature (Tg+50° C.) in a longitudinal direction, for example, at a draw ratio of about 1.01 to about 3 times, and preferably about 1.05 to about 1.5 times, and then carrying out another drawing in a widthwise direction at a draw ratio of about 3 to about 10 times, and preferably about 4 to about 6 times.

The plastic films for use herein may have a surface which has been subjected to a common surface treatment such as corona discharge treatment or treatment with a primer.

[Application and Curing of Coating Composition]

The coating composition is applied to the obtained plastic film to form a coating layer. The application is preferably carried out by off-line coating through gravure printing or flexographic printing, from the viewpoint of productivity and processabilities including curability.

Next, curing of the coating layer is conducted. The curing and printing (coating) in a series of steps are preferable. The curing is conducted by the irradiation typically with an active energy ray using an ultraviolet (UV) lamp, an ultraviolet LED, or ultraviolet laser. The active energy ray to be applied may vary depending on the composition of the coating composition, is not particularly limited, but is preferably an ultraviolet ray having wavelengths of 300 to 460 nm (near-ultraviolet ray), from the viewpoint of curability. The irradiation is preferably conducted at an irradiation intensity of 150 to 1000 mJ/cm$^2$ for a duration of 0.1 to 3 seconds.

The label thus obtained is slit to predetermined widths and wound into rolls. Thus, a plastic label is obtained as rolls.

Next, an embodiment of a process in which the obtained plastic label is attached to a container will be illustrated below. It should be noted, however, that the process is not limited thereto.

[Processing of Long Plastic Label]

Next, one of the rolls is unwound and formed into a round cylinder so that a widthwise direction of the long plastic film stands a circumferential direction of the cylinder and that the coating layer faces outward. Specifically, the long shrink label is formed into a cylinder, and a solvent, such as tetrahydrofuran (THF), and/or an adhesive (these components are hereinafter referred to as "solvent or another component") is applied in a swath about 2 to 4 mm wide in a longitudinal direction to an inner surface of one lateral end of the label. The label is then cylindrically wound so that the portion where the solvent or another component is applied is overlaid the outer surface of the other lateral end of the label at a position of 5 to 10 mm inside from the other lateral end, affixed and adhered (center-sealed). Thus, a long cylindrical plastic label is obtained as a continuous long cylindrical plastic label. It is desirable that no coating layer is arranged in portions where the solvent or another component is applied and where adhesion is carried out.

When perforations for tearing the label are arranged, perforations with predetermined lengths and intervals (pitches) are formed in a longitudinal direction. The perforations can be arranged according to a common procedure. They can be arranged, for example, by pressing a disk-like blade peripherally having cutting edges and non-cutting portions alternately, or by using laser. The step of arranging perforations can be carried out as appropriate in a suitable stage, such as after the printing step, or before or after the step of processing to form a cylindrical label.

[Labeled Container]

Finally, the above-prepared long cylindrical plastic label is cut, attached to a predetermined container, shrunk by heat treatment, thereby brought into intimate contact with the container, and yields a labeled container. The long cylindrical plastic label is fed to an automatic labeling machine (shrink labeler), cut to a required length, fit onto a container filled with a content, subjected to thermal shrinkage by allowing the article to pass through a hot-air tunnel or steam tunnel at a predetermined temperature or by heating the article with radial heat such as infrared rays, thereby brought into intimate contact with the container, and thus yields a labeled container. The heat treatment may be carried out, for example, by treating the article with steam at 80° C. to 100° C. Typically, the article may be allowed to pass through a heating tunnel filled with steam and vapor.

EXAMPLES

The present invention will be illustrated in further detail with reference to several examples below. It should be noted, however, these examples are never construed to limit the scope of the present invention. Methods for measuring properties and methods for evaluating advantageous effects in the present invention including the following examples are as follows.

[Methods for Measuring Properties and Evaluating Advantageous Effects]

(1) Gravure Printability

Gravure printing was carried out under printing conditions mentioned below, using coating compositions and plastic films according to examples and comparative examples, and the resulting prints were visually observed. A sample having a print in exact accordance with the printing plate was evaluated as having good gravure printability ("○"), and a sample having a print not in accordance with the printing plate was evaluated as having poor gravure printability ("×").

In the evaluation of gravure printability, the process speed was set different between samples according to Examples 1 to 15 and Comparative Examples 1 to 4, and samples according to Examples 16 to 30 and Comparative Examples 5 to 10, as follows.

Apparatus: Bench gravure printing machine (supplied from Nissio Gravure Co., Ltd. as "GRAVO PROOF MINI")

Photogravure cylinder (gravure plate): 175 lines, plate depth of 30 μm

Process speed: 80 m/min (Examples 1 to 15 and Comparative Examples 1 to 4), 50 m/min (Examples 16 to 30 and Comparative Examples 5 to 10)

(2) Curability (Surface Tack)

Immediately after carrying out curing in the examples and comparative examples, the surfaces of coating layers were touched by a finger, and whether or not the ink was attached to the finger was visually observed. A sample was evaluated as having good curability (○) when the ink was not attached to the finger; and one was evaluated as having poor curability ("×") when the ink was attached to the finger.

(3) Chemical Resistance (MEK Rubbing Test)

Surfaces of coating layers of plastic labels were rubbed ten times in back-and-forth motion with a cotton swab impregnated with methyl ethyl ketone, and the surfaces were visually observed. A sample whose ink was not peeled off was evaluated as having good chemical resistance ("○"). A sample whose ink was peeled off was evaluated as having poor chemical resistance ("×").

(4) Adhesiveness (Adhesion to Base Material) (Tape Peeling Test)

Tests were conducted according to JIS K 5600, except for not forming cross cuts. NICHIBAN tapes (18 mm wide) were affixed to surfaces of resin layers of plastic labels prepared according to the examples and comparative examples, were then peeled off at an angle of 90 degrees, the areas of residual resin layers were observed in regions each 5 mm wide and 5 mm long, and the adhesion was evaluated according to the following criteria:

Residual rate is 90% or more: Good adhesiveness ("○");

Residual rate is 80% or more and less than 90%: Somewhat poor but usable adhesiveness ("Δ");

Residual rate is less than 80%: Poor adhesiveness ("×")

(5) Crumpling Resistance

Sample pieces 100 mm long and 100 mm wide were sampled from plastic labels prepared according to the examples. The sample pieces were held by hand at both ends, and crumpled ten times by hand. The areas of residual resin layers on the surfaces of the crumpled sample pieces were visually observed, and the crumpling resistance was evaluated as follows. A sample showing a residual area of 90% or more was evaluated as having good crumpling resistance ("○"), and one showing a residual area of less than 90% was evaluated as having poor crumpling resistance ("×").

(6) Scratch Resistance (Scratch Test)

Sample pieces 100 mm long and 100 mm wide were sampled from plastic labels prepared according to the examples. The sample pieces were placed on a flat table, the surfaces of the sample pieces on the side bearing a coating layer were rubbed with the back of a finger nail ten times in back-and-forth motion in a region of 20 mm in a longitudinal direction, the surfaces were then observed, and the scratch resistance was evaluated according to the following criteria:

The coating layer was not at all peeled off: Good scratch resistance ("○");

The coating layer was partially peeled off: Somewhat poor but usable scratch resistance ("Δ");

The coating layer was remarkably peeled off: Poor scratch resistance ("×")

(7) Suitability for Shrinking

Labeled containers were prepared in the same manner as in Example 1, using plastic labels prepared according to the examples. The plastic labels were then detached from the labeled containers, and coating layers in portions which had been attached to bodies of the containers were observed upon whether or not there were delamination or crack (large crack) of the ink, remarkable whitening due to fine cracks in the case of a transparent ink, and transfer (migration) of the coating layer to the container. Each ten labeled containers were tested. A sample showing any defect such as cracking in none of ten labeled containers was evaluated as having good suitability for shrinking ("○"), and one showing any defect such as cracking at least in one labeled container was evaluated as having poor suitability for shrinking ("×").

(8) Thicknesses of Film Layer and Coating Layer

The thicknesses of films were measured with a stylus-type thickness gauge. The thicknesses of coating layers were measured as the step height between a portion where a coating layer is arranged (coated surface) and a portion where no coating layer is arranged (non-coated surface) with a three-dimensional microscope (Keyence Corporation; VK 8510).

(9) Thermal Shrinkage (90° C.) of Plastic Film

Rectangular sample pieces were cut out from the plastic films in a measurement direction (longitudinal direction or widthwise direction). The sample pieces had a length of 200 mm (gauge length: 150 mm) and a width of 10 mm.

The sample pieces were subjected to heat treatment (under no load) in hot water at 90° C. for 10 seconds, the differences in gauge length between before and after the heat treatment and thermal shrinkages were calculated according to the following calculation formula:

$$\text{Thermal shrinkage}(\%) = (L_0 - L_1)/L_0 \times 100$$

$L_0$: Gauge length before the heat treatment
$L_1$: Gauge length after the heat treatment

(10) Viscosity

The viscosities were measured according to JIS Z 8803 with a Brookfield viscometer (single-cylinder rotary viscometer) supplied from Toki Sangyo Co., Ltd. at 23±2° C. and a number of revolutions of the cylinder of 60.

Some examples are shown below. The amounts (parts by weight) of components and evaluation results in these examples are shown in Tables 1 and 2.

Example 1

A coating composition as a white ink was prepared by dispersing and mixing materials in the amounts (parts by weight) shown in Table 1 in a disperser for 30 minutes, whereas no solvent was used. The materials are 3-ethyl-3-hydroxymethyloxetane (supplied by Toagosei Co., Ltd. under the trade name of "ARON OXETANE OXT-101") as Component A; an epoxy monomer (supplied by The Dow Chemical Company under the trade name of "UVR-6110") as Component B; 1,3-dioxolane (supplied by Sigma-Aldrich, Inc.) as Component C; a photo-induced polymerization initiator (supplied by The Dow Chemical Company under the trade name of "UVI-6992"); titanium oxide (supplied by Ishihara Sangyo Kaisha, Ltd. under the trade name of "TIPAQUE PF736") as a white pigment; and a sensitizer (supplied by Nippon Kayaku Co., Ltd. under the trade name of "KAYA-CURE CTX").

The prepared coating composition was applied to one side of a polyester shrink film (supplied by Toyobo Co., Ltd. under the trade name of "Spaceclean S7042", film thickness: 50 μm) to form a coating layer by gravure printing at a process speed of 80 m/minute using a bench gravure printing machine (supplied by Nissio Gravure Co., Ltd. under the trade name of "GRAVO PROOF MINI") and a photogravure cylinder (gravure plate) with 175 lines having a plate depth of 30 μm, and the gravure printability was evaluated.

Additionally, the coating composition was applied to another shrink film using the same photogravure cylinder in the same manner as above, except at a process speed of 50 m/min, to give a coating layer, and the coating layer was cured by light irradiation with an ultraviolet irradiator with an electrode discharge lamp (supplied by GS Yuasa Lighting Ltd. under the trade name of "4-kW (160 W/cm) UV Irradiator") at a conveyer speed of 50 m/minute and an irradiation intensity of 120 W/cm. Thus, a plastic label was prepared, whose coating layer had a thickness of 3 μm. The curability and adhesiveness of the prepared plastic label were evaluated.

Subsequently, the obtained plastic label was formed into a round cylinder so that the printed surface constitutes an inner side; the length in circumferential direction of the cylinder was adjusted so that the label would be attached to a body of a PET bottle with thermal shrinkage of 20%; and both ends of the label were fused and adhered with each other to yield a cylindrical plastic label. The cylindrical plastic label was attached to a 500-ml PET bottle, subjected to shrinking of the film by passing through a steam tunnel at an atmosphere temperature of 90° C., to yield a labeled container.

As is demonstrated in Table 1, the prepared coating composition was excellent in gravure printability and good in curability and adhesiveness. The prepared labeled container showed excellent finished quality.

Example 2

A transparent coating composition, a plastic label, and a labeled container were prepared by the procedure of Example 1, except for using no titanium oxide and for changing the amounts of the respective components as shown in Table 1.

As is demonstrated in Table 1, the prepared coating composition was excellent in gravure printability and good in curability and adhesiveness. The prepared labeled container showed excellent finished quality.

Example 3

A coating composition, a plastic label, and a labeled container were prepared by the procedure of Example 1, except for using the cyclic acetal (1,3-dioxolane) in combination with a poly(vinyl butyral) (supplied by Denki Kagaku Kogyo Kabushiki Kaisha as "Denka Butyral") as Component C, and for further using 2-(2-vinyloxyethoxy)ethyl methacrylate (VEEM) (supplied by Nippon Shokubai Corporation) and an epoxy-modified silicone fluid (supplied by Shin-Etsu Chemical Co., Ltd. as "X-22-169B"), as shown in Table 1.

As is demonstrated in Table 1, the prepared coating composition was excellent in gravure printability and good in curability and adhesiveness. The prepared labeled container showed excellent finished quality.

Examples 4 and 5

Coating compositions, plastic labels, and labeled containers were prepared by the procedure of Example 1, except for changing the amount of Component C as shown in Table 1.

As is demonstrated in Table 1, the prepared coating compositions had good gravure printability, good curability, and good adhesiveness. The prepared labeled containers showed excellent finished quality.

Example 6

A coating composition, a plastic label, and a labeled container were prepared by the procedure of Example 1, except for using, instead of 1,3-dioxolane, 1,4-dioxane (supplied by Sigma-Aldrich, Inc.) as Component C as shown in Table 1.

As is demonstrated in Table 1, the prepared coating composition was excellent in gravure printability and good in curability and adhesiveness. The prepared labeled container showed excellent finished quality.

Examples 7 to 15

Coating compositions, plastic labels, and labeled containers were prepared by the procedure of Example 1, except for changing types and amounts of respective components, and typically for further adding a silicone compound, as shown in Table 1.

As is demonstrated in Table 1, the prepared coating compositions were excellent in gravure printability and good in curability and adhesiveness. The prepared labeled containers showed excellent finished quality.

Further, for the plastic labels prepared according to Examples 1 to 15, the chemical resistance, crumpling resistance, scratch resistance, and suitability for shrinking were evaluated. The results demonstrate that these plastic labels were excellent in chemical resistance, crumpling resistance, scratch resistance, and suitability for shrinking.

Comparative Example 1

A coating composition was prepared by the procedure of Example 1, except for using no Component A and for changing the amount of Component B, as shown in Table 1.

The prepared coating composition had a high viscosity, showed poor coatability, and caused "poor coverage" upon gravure printing. It was also poor in curability and adhesiveness.

Comparative Example 2

A coating composition was prepared by the procedure of Example 1, except for using no Component B and for changing the amount of Component A, as shown in Table 1.

The prepared coating composition had poor curability to show poor productivity, and had poor adhesiveness.

Comparative Example 3

A coating composition was prepared by the procedure of Example 1, except for using no Component C, as shown in Table 1.

The prepared coating composition had poor curability to show poor productivity.

For Comparative Example 3, the plastic label was prepared by carrying out ultraviolet irradiation of the coating layer in two passes to cure the coating layer; and the chemical resistance, crumpling resistance, scratch resistance, and suitability for shrinking of the plastic label were evaluated.

Comparative Example 4

A coating composition was prepared in accordance with Example 1 of JP-A No. 2004-35862, using no Component A and compounding 86 parts by weight of 3,4-epoxycyclohexylmethyl-3',4'-epoxycyclohexanecarboxylate (supplied by Daicel Chemical Industries, Ltd. as "Celloxide 2021P") as Component B; 10 parts by weight of 1,3-dioxolane (supplied by Sigma-Aldrich, Inc.) as Component C; and 4 parts by weight of a photo-induced polymerization initiator, as shown in Table 1.

As is demonstrated in Table 1, the prepared coating composition cured slowly, caused "fog" and "poor coverage" upon gravure printing, and failed to form a coating layer.

TABLE 1

| | | | Supplier | Product name | Ex. 1 | Ex. 2 | Ex. 3 | Ex. 4 | Ex. 5 | Ex. 6 |
|---|---|---|---|---|---|---|---|---|---|---|
| Amount (part by weight) | Component A | Oxetane compound | Toagosei Co., Ltd. | ARON OXETANE OXT 101 | 40 | 64 | 40 | 40 | 40 | 40 |
| | | | Toagosei Co., Ltd. | ARON OXETANE OXT 221 | | | | | | |
| | Component B | Epoxy compound | The Dow Chemical Company | UVR 6110 | 17 | 27 | 17 | 17 | 17 | 17 |
| | | | Daicel Chemical Industries, Ltd. | CELLOXIDE 2021P | | | | | | |
| | Component C | Cyclic acetal | Sigma-Aldrich, Inc. | 1,3-dioxolane | 5 | 5 | 5 | 2 | 14 | |
| | | | Sigma-Aldrich, Inc. | 1,4-dioxane | | | | | | 5 |
| | | Poly(vinyl butyral) | Denki Kagaku Kogyo K.K. | Denka Butyral | | | | 5 | | |
| | Initiator | | The Dow Chemical Company | UVI-6992 | 3 | 3 | 3 | 3 | 3 | 3 |
| | | | | Uvacure 1591 | | | | | | |
| | Sensitizer | | Nippon Kayaku Co., Ltd. | KAYACURE CTX | 1 | 1 | 1 | 1 | 1 | 1 |
| | | | Kawasaki Kasei Chemicals Ltd. | 9,10-dibutoxyanthracene | | | | | | |
| | Pigment | Titanium oxide (white) | Ishihara Sangyo Kaisha, Ltd. TAYCA CORPORATION | TIPAQUE PF736 JR-809 | 34 | | 34 | 34 | 34 | 34 |
| | | Pigment Blue 15:3 (blue) | Ciba Specialty Chemicals Corporation | IRGALITE Blue GLO | | | | | | |
| | | Pigment Red 254 (red) | Ciba Specialty Chemicals Corporation | CROMOPHTAL Red 2030 | | | | | | |
| | Other (VEEM) | | Nippon Shokubai Corporation | VEEM | | | | | 5 | |
| | Silicone compound | Epoxy-modified | Shin-Etsu Chemical Co., Ltd. | X-22-169B | | | | 2 | | |
| | | | Shin-Etsu Chemical Co., Ltd. | X-22-169AS | | | | | | |
| | | Phenol-modified | Shin-Etsu Chemical Co., Ltd. | X-22-1821 | | | | | | |
| | | Fluorine-modified | Shin-Etsu Chemical Co., Ltd. | X-22-821 | | | | | | |
| | | Polyether-modified | Shin-Etsu Chemical Co., Ltd. | X-22-2516 | | | | | | |
| | | Carboxyl-modified | Shin-Etsu Chemical Co., Ltd. | X-22-3710 | | | | | | |
| Evaluation Item | Gravure printability | | | | ○ | ○ | ○ | Δ | ○ | ○ |
| | Curability (surface tack) | | | | ○ | ○ | ○ | ○ | ○ | ○ |
| | Adhesiveness | | | | ○ | ○ | ○ | ○ | ○ | ○ |
| | Chemical resistance | | | | ○ | ○ | ○ | ○ | ○ | ○ |
| | Crumpling resistance | | | | ○ | ○ | ○ | ○ | ○ | ○ |
| | Scratch resistance | | | | ○ | ○ | ○ | ○ | ○ | ○ |
| | Suitability for shrinking | | | | ○ | ○ | ○ | ○ | ○ | ○ |

| | | | Supplier | Product name | Ex. 7 | Ex. 8 | Ex. 9 | Ex. 10 | Ex. 11 | Ex. 12 | Ex. 13 |
|---|---|---|---|---|---|---|---|---|---|---|---|
| Amount (part by weight) | Component A | Oxetane compound | Toagosei Co., Ltd. | ARON OXETANE OXT 101 | 31 | 40 | 40 | | | | |
| | | | Toagosei Co., Ltd. | ARON OXETANE OXT 221 | | | | 33 | 33 | 33 | 33 |
| | Component B | Epoxy compound | The Dow Chemical Company | UVR 6110 | 14 | 17 | 17 | | | | |
| | | | Daicel Chemical Industries, Ltd. | CELLOXIDE 2021P | | | | 18 | 18 | 18 | 18 |

TABLE 1-continued

| | | | Supplier | Product name | Ex.8 | Ex.9 | Ex.10 | Ex.11 | Ex.12 | Ex.13 |
|---|---|---|---|---|---|---|---|---|---|---|
| | Component C | Cyclic acetal | Sigma-Aldrich, Inc. | 1,3-dioxolane | 5 | 14 | | 5 | 5 | 5 | 5 |
| | | | Sigma-Aldrich, Inc. | 1,4-dioxane | | | 5 | | | | |
| | | Poly(vinyl butyral) | Denki Kagaku Kogyo K.K. | Denka Butyral | 5 | | | | | | |
| | Initiator | | The Dow Chemical Company | UVI-6992 | 3 | 3 | 3 | 3 | 3 | 3 | 3 |
| | | | | Uvacure 1591 | | | | | | | |
| | Sensitizer | | Nippon Kayaku Co., Ltd. | KAYACURE CTX | 1 | | | | | | |
| | | | Kawasaki Kasei Chemicals Ltd. | 9,10-dibutoxyanthracene | | 1 | 1 | 1 | 1 | 1 | 1 |
| | Pigment | Titanium oxide (white) | Ishihara Sangyo Kaisha, Ltd. | TIPAQUE PF736 | 34 | | | | | | |
| | | | TAYCA CORPORATION | JR-809 | | 34 | 34 | 34 | 34 | 34 | 34 |
| | | Pigment Blue 15:3 (blue) | Ciba Specialty Chemicals Corporation | IRGALITE Blue GLO | | | | | | | |
| | | Pigment Red 254 (red) | Ciba Specialty Chemicals Corporation | CROMOPHTAL Red 2030 | | | | | | | |
| | Other (VEEM) | | Nippon Shokubai Corporation | VEEM | 5 | | | | | | |
| | Silicone compound | Epoxy-modified | Shin-Etsu Chemical Co., Ltd. | X-22-169B | 2 | | | | | | |
| | | | Shin-Etsu Chemical Co., Ltd. | X-22-169AS | | | | 3 | | | |
| | | Phenol-modified | Shin-Etsu Chemical Co., Ltd. | X-22-1821 | | | | | 6 | | |
| | | Fluorine-modified | Shin-Etsu Chemical Co., Ltd. | X-22-821 | | | | | | 6 | |
| | | Polyether-modified | Shin-Etsu Chemical Co., Ltd. | X-22-2516 | | | | | | | 5 |
| | | Carboxyl-modified | Shin-Etsu Chemical Co., Ltd. | X-22-3710 | | | | | | | |
| Evaluation Item | Gravure printability | | | | ○ | ○ | ○ | ○ | ○ | ○ | ○ |
| | Curability (surface tack) | | | | Δ | ○ | ○ | ○ | ○ | ○ | ○ |
| | Adhesiveness | | | | ○ | ○ | ○ | ○ | ○ | ○ | ○ |
| | Chemical resistance | | | | ○ | ○ | ○ | ○ | ○ | ○ | ○ |
| | Crumpling resistance | | | | ○ | ○ | ○ | ○ | ○ | ○ | ○ |
| | Scratch resistance | | | | ○ | ○ | ○ | ○ | ○ | ○ | ○ |
| | Suitability for shrinking | | | | ○ | ○ | ○ | ○ | ○ | ○ | ○ |

| | | | Supplier | Product name | Ex. 14 | Ex. 15 | Com. Ex. 1 | Com. Ex. 2 | Com. Ex. 3 | Com. Ex. 4 |
|---|---|---|---|---|---|---|---|---|---|---|
| Amount (part by weight) | Component A | Oxetane compound | Toagosei Co., Ltd. | ARON OXETANE OXT 101 | | | 0 | 57 | 43 | |
| | | | Toagosei Co., Ltd. | ARON OXETANE OXT 221 | 52 | 52 | | | | |
| | Component B | Epoxy compound | The Dow Chemical Company | UVR 6110 | | | 57 | 0 | 19 | |
| | | | Daicel Chemical Industries, Ltd. | CELLOXIDE 2021P | 24 | 22 | | | | 86 |
| | Component C | Cyclic acetal | Sigma-Aldrich, Inc. | 1,3-dioxolane | 5 | 5 | 5 | 5 | 0 | 10 |
| | | | Sigma-Aldrich, Inc. | 1,4-dioxane | | | | | | |
| | | Poly(vinyl butyral) | Denki Kagaku Kogyo K.K. | Denka Butyral | | | | | | |
| | Initiator | | The Dow Chemical Company | UVI-6992 | 3 | 3 | 3 | 3 | 3 | |
| | | | | Uvacure 1591 | | | | | | 4 |
| | Sensitizer | | Nippon Kayaku Co., Ltd. | KAYACURE CTX | | | 1 | 1 | 1 | |
| | | | Kawasaki Kasei Chemicals Ltd. | 9,10-dibutoxyanthracene | 1 | 1 | | | | |
| | Pigment | Titanium oxide (white) | Ishihara Sangyo Kaisha, Ltd. | TIPAQUE PF736 | | | | | | |
| | | | TAYCA CORPORATION | JR-809 | | | 34 | 34 | 34 | |
| | | Pigment Blue 15:3 (blue) | Ciba Specialty Chemicals Corporation | IRGALITE Blue GLO | 10 | | | | | |
| | | Pigment Red 254 (red) | Ciba Specialty Chemicals Corporation | CROMOPHTAL Red 2030 | | 12 | | | | |
| | Other (VEEM) | | Nippon Shokubai Corporation | VEEM | | | | | | |
| | Silicone compound | Epoxy-modified | Shin-Etsu Chemical Co., Ltd. | X-22-169B | | | | | | |
| | | | Shin-Etsu Chemical Co., Ltd. | X-22-169AS | | | | | | |
| | | Phenol-modified | Shin-Etsu Chemical Co., Ltd. | X-22-1821 | | | | | | |
| | | Fluorine-modified | Shin-Etsu Chemical Co., Ltd. | X-22-821 | | | | | | |
| | | Polyether-modified | Shin-Etsu Chemical Co., Ltd. | X-22-2516 | | | | | | |
| | | Carboxyl-modified | Shin-Etsu Chemical Co., Ltd. | X-22-3710 | 5 | 5 | | | | |
| Evaluation Item | Gravure printability | | | | ○ | ○ | x | ○ | ○ | x |
| | Curability (surface tack) | | | | ○ | ○ | x | x | x | x |
| | Adhesiveness | | | | ○ | ○ | x | x | ○ | x |
| | Chemical resistance | | | | ○ | ○ | — | — | ○ | — |
| | Crumpling resistance | | | | ○ | ○ | — | — | ○ | — |
| | Scratch resistance | | | | ○ | ○ | — | — | ○ | — |
| | Suitability for shrinking | | | | ○ | ○ | — | — | ○ | — |

Example 16

A coating composition as a white ink was prepared by dispersing and mixing materials in the amounts (parts by weight) shown in Table 2 in a disperser for 30 minutes, whereas no solvent was used. The materials are 3-ethyl-3-hydroxymethyloxetane (supplied by Toagosei Co., Ltd. under the trade name of "ARON OXETANE OXT-101") as Component A; an epoxy monomer (supplied by The Dow Chemical Company under the trade name of "UVR-6110") as Component B; a poly(vinyl butyral) (supplied by Denki Kagaku Kogyo Kabushiki Kaisha under the trade name of "Denka Butyral #3000-1") as Component C; a photo-induced polymerization initiator (supplied by The Dow Chemical Company under the trade name of "UVI-6992"); titanium oxide (supplied by Ishihara Sangyo Kaisha, Ltd. under the trade name of "TIPAQUE PF736") as a white pigment; and a sensitizer (supplied by Nippon Kayaku Co., Ltd. under the trade name of "KAYACURE CTX").

The prepared coating composition was applied to one side of a polyester shrink film (supplied by Toyobo Co., Ltd. under the trade name of "Spaceclean S7042", film thickness: 50 μm) to form a coating layer gravure printing at a process speed of 50 m/minute using a bench gravure printing machine (supplied by Nissio Gravure Co., Ltd. under the trade name of "GRAVO PROOF MINI") and a photogravure cylinder (gravure plate) with 175 lines having a plate depth of 30 μm, and the gravure printability was evaluated.

The coating layer was cured by light irradiation with an ultraviolet irradiator with an electrode discharge lamp (supplied by GS Yuasa Lighting Ltd. under the trade name of "4-kW (160 W/cm) UV Irradiator") at a conveyer speed of 80 m/minute and an irradiation intensity of 120 W/cm. Thus, a plastic label was prepared, whose coating layer had a thickness of 3 μm. The curability and adhesion to base materials of the prepared plastic label were evaluated.

Subsequently, the plastic label was formed into a round cylinder so that the printed surface constitutes an inner side; the length in circumferential direction of the cylinder was adjusted so that the label would be attached to a body of a PET bottle with thermal shrinkage of 20%; both ends of the label were fused and adhered with each other to yield a cylindrical plastic label. The cylindrical plastic label was attached to a 500-ml PET bottle, subjected to shrinking of the film by passing through a steam tunnel at an atmosphere temperature of 90° C., to yield a labeled container.

As is demonstrated in Table 2, the prepared coating composition was excellent in gravure printability and good in curability and adhesion. The prepared labeled container showed excellent finished quality.

Example 17

A transparent coating composition, a plastic label, and a labeled container were prepared by the procedure of Example 16, except for using no titanium oxide and for changing the amounts of the respective components as shown in Table 2.

As is demonstrated in Table 2, the prepared coating composition was excellent in gravure printability and good in curability and adhesiveness (adhesion to base materials). The prepared labeled container showed excellent finished quality.

Examples 18 and 19

Coating compositions, plastic labels, and labeled containers were prepared by the procedure of Example 16, except for changing the amount of Component C as shown in Table 2.

As is demonstrated in Table 2, the prepared coating compositions had good gravure printability, good curability, and good adhesiveness. The prepared labeled containers showed excellent finished quality.

Examples 20 to 30

Coating compositions, plastic labels, and labeled containers were prepared by the procedure of Example 16, except for changing types and amounts of respective components, and, in Examples 25 to 30, for further adding a silicone compound, as shown in Table 2.

As is demonstrated in Table 2, the prepared coating compositions had good gravure printability, good curability, and good adhesiveness. The prepared labeled containers showed excellent finished quality.

For the plastic labels prepared according to Examples 16 to 30, the chemical resistance, crumpling resistance, scratch resistance, and suitability for shrinking were further evaluated. The results demonstrate that these plastic labels were excellent in chemical resistance, crumpling resistance, scratch resistance, and suitability for shrinking.

Comparative Example 5

A coating composition was prepared by the procedure of Example 16, except for using no Component A and for changing the amount of Component B, as shown in Table 2.

The prepared coating composition had a high viscosity, showed poor coatability, and caused "poor coverage" upon gravure printing. It was also poor in curability and adhesiveness.

Comparative Example 6

A coating composition was prepared by the procedure of Example 16, except for using no Component B and for changing the amount of Component A, as shown in Table 2.

The prepared coating composition had insufficient curability to show poor productivity, and had poor adhesiveness.

Comparative Examples 7 to 9

Coating compositions were prepared by the procedure of Example 16, except for changing, for example, types and amounts of the respective components, as shown in Table 2.

The prepared coating compositions all had poor curability to show poor productivity. The coating composition according to Comparative Example 7 was also poor in printability and adhesiveness. The coating composition according to Comparative Example 8 was also poor in adhesiveness.

For Comparative Example 9, the plastic label was prepared by carrying out ultraviolet irradiation of the coating layer in two passes; and the chemical resistance, crumpling resistance, scratch resistance, and suitability for shrinking of the plastic label were evaluated.

Comparative Example 10

A coating composition was prepared in accordance with the procedure in Example 1 of JP-A No. 2004-269690, by compounding 20 parts by weight of a photo-sensitive butyral resin (supplied by Sekisui Chemical Co., Ltd. as "S-LEC BL-1"); 20 parts by weight of phthalocyanine blue; 25 parts by weight of dipentaerythritol hexaacrylate; 15 parts by weight of trimethylolpropane acrylate; 15 parts by weight of tripropylene glycol diacrylate; and 5 parts by weight of a photo-induced polymerization initiator (supplied by Ciba Specialty Chemicals Corporation under the trade name of "IRGACURE 907").

As is demonstrated in Table 2, the prepared coating composition had a high viscosity, caused "fog" and "poor coverage" upon gravure printing, and failed to form a coating layer by gravure printing.

TABLE 2

| | | | Supplier | Product name | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| Amount (part by weight) | Component A | Oxetane compound | Toagosei Co., Ltd. | ARON OXETANE OXT 101 | 40 | 64 | 40 | 40 | 29 | 46 | 29 | 29 | |
| | | | Toagosei Co., Ltd. | ARON OXETANE OXT 221 | | | | | | | | | 33 |
| | Component B | Epoxy compound | The Dow Chemical Company | UVR 6110 | 17 | 27 | 17 | 17 | 28 | 45 | 28 | 28 | |
| | | | Daicel Chemical Industries, Ltd. | CELLOXIDE 2021P | | | | | | | | | 18 |
| | Component C | Poly(vinyl butyral) | Denki Kagaku Kogyo K.K. | Denka Butyral #3000-1 | 5 | 5 | 2 | 14 | 5 | 5 | 2 | 14 | 5 |
| | | | Sekisui Chemical Co., Ltd. | S-LEC BL-1 | | | | | | | | | |
| | Initiator | | The Dow Chemical Company | UVI-6992 | 3 | 3 | 3 | 3 | 3 | 3 | 3 | 3 | 3 |
| | | | Ciba Specialty Chemicals | IRGACURE 907 | | | | | | | | | |
| | Sensitizer | | Nippon Kayaku Co., Ltd. | KAYACURE CTX | 1 | 1 | 1 | 1 | 1 | 1 | 1 | 1 | |
| | | | Kawasaki Kasei Chemicals Ltd. | 9,10-dibutoxyanthracene | | | | | | | | | 1 |
| | Pigment | Titanium oxide (white) | Ishihara Sangyo Kaisha, Ltd. | TIPAQUE PF736 | 34 | | 34 | 34 | 34 | | 34 | 34 | |
| | | | TAYCA CORPORATION | JR-809 | | | | | | | | | 34 |
| | | Pigment Blue 15:3 (blue) | Ciba Specialty Chemicals Corporation | IRGALITE Blue GLO | | | | | | | | | |
| | | Pigment Red 254 (red) | Ciba Specialty Chemicals Corporation | CROMOPHTAL Red 2030 | | | | | | | | | |
| | Silicone compound | Epoxy-modified | Shin-Etsu Chemical Co., Ltd. | X-22-169AS | | | | | | | | | |
| | | Phenol-modified | Shin-Etsu Chemical Co., Ltd. | X-22-1821 | | | | | | | | | |
| | | Fluorine-modified | Shin-Etsu Chemical Co., Ltd. | X-22-821 | | | | | | | | | |
| | | Polyether-modified | Shin-Etsu Chemical Co., Ltd. | X-22-2516 | | | | | | | | | |
| | | Carboxyl-modified | Shin-Etsu Chemical Co., Ltd. | X-22-3710 | | | | | | | | | |
| | | Phthalocyanine blue | | | | | | | | | | | |
| | | Dipentaerythritol hexaacrylate | | | | | | | | | | | |
| | | Trimethylolpropane acrylate | | | | | | | | | | | |
| Evaluation item | Gravure printability | | | | ○ | ○ | ○ | ○ | ○ | ○ | Δ | Δ | ○ |
| | Curability (surface tack) | | | | ○ | ○ | ○ | ○ | ○ | ○ | Δ | ○ | ○ |
| | Adhesiveness | | | | ○ | ○ | ○ | ○ | ○ | ○ | ○ | ○ | ○ |
| | Chemical resistance | | | | ○ | ○ | ○ | ○ | ○ | ○ | ○ | ○ | ○ |
| | Crumpling resistance | | | | ○ | ○ | ○ | ○ | ○ | ○ | ○ | ○ | ○ |
| | Scratch resistance | | | | ○ | ○ | ○ | ○ | ○ | ○ | ○ | ○ | ○ |
| | Suitability for shrinking | | | | ○ | ○ | ○ | ○ | ○ | ○ | ○ | ○ | ○ |

| | | | Supplier | Product name | Ex. 25 | Ex. 26 | Ex. 27 | Ex. 28 | Ex. 29 | Ex. 30 | Com. Ex. 5 | Com. Ex. 6 |
|---|---|---|---|---|---|---|---|---|---|---|---|---|
| Amount (part by weight) | Component A | Oxetane compound | Toagosei Co., Ltd. | ARON OXETANE OXT 101 | | | | | | | 0 | 57 |
| | | | Toagosei Co., Ltd. | ARON OXETANE OXT 221 | 33 | 33 | 33 | 33 | 52 | 52 | | |
| | Component B | Epoxy compound | The Dow Chemical Company | UVR 6110 | | | | | | | 57 | 0 |
| | | | Daicel Chemical Industries, Ltd. | CELLOXIDE 2021P | 18 | 18 | 18 | 18 | 24 | 22 | | |
| | Component C | Poly(vinyl butyral) | Denki Kagaku Kogyo K.K. | Denka Butyral #3000-1 | 5 | 5 | 5 | 5 | 5 | 5 | 5 | 5 |
| | | | Sekisui Chemical Co., Ltd. | S-LEC BL-1 | | | | | | | | |
| | Initiator | | The Dow Chemical Company | UVI-6992 | 3 | 3 | 3 | 3 | 3 | 3 | 3 | 3 |
| | | | Ciba Specialty Chemicals | IRGACURE 907 | | | | | | | | |
| | Sensitizer | | Nippon Kayaku Co., Ltd. | KAYACURE CTX | | | | | | | 1 | 1 |
| | | | Kawasaki Kasei Chemicals Ltd. | 9,10-dibutoxyanthracene | 1 | 1 | 1 | 1 | 1 | 1 | | |
| | Pigment | Titanium oxide (white) | Ishihara Sangyo Kaisha, Ltd. | TIPAQUE PF736 | | | | | | | 34 | 34 |
| | | | TAYCA CORPORATION | JR-809 | 34 | 34 | 34 | 34 | | | | |
| | | Pigment Blue 15:3 (blue) | Ciba Specialty Chemicals Corporation | IRGALITE Blue GLO | | | | | 10 | | | |
| | | Pigment Red 254 (red) | Ciba Specialty Chemicals Corporation | CROMOPHTAL Red 2030 | | | | | | 12 | | |
| | Silicone compound | Epoxy-modified | Shin-Etsu Chemical Co., Ltd. | X-22-169AS | 3 | | | | | | | |
| | | Phenol-modified | Shin-Etsu Chemical Co., Ltd. | X-22-1821 | | 6 | | | | | | |
| | | Fluorine-modified | Shin-Etsu Chemical Co., Ltd. | X-22-821 | | | 6 | | | | | |
| | | Polyether-modified | Shin-Etsu Chemical Co., Ltd. | X-22-2516 | | | | 5 | | | | |
| | | Carboxyl-modified | Shin-Etsu Chemical Co., Ltd. | X-22-3710 | | | | | 5 | 5 | | |
| | | Phthalocyanine blue | | | | | | | | | | |
| | | Dipentaerythritol hexaacrylate | | | | | | | | | | |
| | | Trimethylolpropane acrylate | | | | | | | | | | |
| Evaluation item | Gravure printability | | | | ○ | ○ | ○ | ○ | ○ | ○ | x | ○ |
| | Curability (surface tack) | | | | ○ | ○ | ○ | ○ | ○ | ○ | x | x |
| | Adhesiveness | | | | ○ | ○ | ○ | ○ | ○ | ○ | x | x |
| | Chemical resistance | | | | ○ | ○ | ○ | ○ | ○ | ○ | — | — |
| | Crumpling resistance | | | | ○ | ○ | ○ | ○ | ○ | ○ | — | — |
| | Scratch resistance | | | | ○ | ○ | ○ | ○ | ○ | ○ | — | — |
| | Suitability for shrinking | | | | ○ | ○ | ○ | ○ | ○ | ○ | — | — |

TABLE 2-continued

|  |  |  | Supplier | Product name | Com. Ex. 7 | Com. Ex. 8 | Com. Ex. 9 | Com. Ex. 10 |
|---|---|---|---|---|---|---|---|---|
| Amount (part by weight) | Component A | Oxetane compound | Toagosei Co., Ltd. | ARON OXETANE OXT 101 | 0 | 29 | 29 |  |
|  |  |  | Toagosei Co., Ltd. | ARON OXETANE OXT 221 |  |  |  |  |
|  | Component B | Epoxy compound | The Dow Chemical Company | UVR 6110 | 28 | 0 | 28 |  |
|  |  |  | Daicel Chemical Industries, Ltd. | CELLOXIDE 2021P |  |  |  |  |
|  | Component C | Poly(vinyl butyral) | Denki Kagaku Kogyo K.K. | Denka Butyral #3000-1 | 5 | 5 | 0 |  |
|  |  |  | Sekisui Chemical Co., Ltd. | S-LEC BL-1 |  |  |  | 20 |
|  | Initiator |  | The Dow Chemical Company | UVI-6992 | 3 | 3 | 3 |  |
|  |  |  | Ciba Specialty Chemicals | IRGACURE 907 |  |  |  | 5 |
|  | Sensitizer |  | Nippon Kayaku Co., Ltd. | KAYACURE CTX | 1 | 1 | 1 |  |
|  |  |  | Kawasaki Kasei Chemicals Ltd. | 9,10-dibutoxyanthracene |  |  |  |  |
|  | Pigment | Titanium oxide (white) | Ishihara Sangyo Kaisha, Ltd. | TIPAQUE PF736 | 34 | 34 | 34 |  |
|  |  |  | TAYCA CORPORATION | JR-809 |  |  |  |  |
|  |  | Pigment Blue 15:3 (blue) | Ciba Specialty Chemicals Corporation | IRGALITE Blue GLO |  |  |  |  |
|  |  | Pigment Red 254 (red) | Ciba Specialty Chemicals Corporation | CROMOPHTAL Red 2030 |  |  |  |  |
|  | Silicone compound | Epoxy-modified | Shin-Etsu Chemical Co., Ltd. | X-22-169AS |  |  |  |  |
|  |  | Phenol-modified | Shin-Etsu Chemical Co., Ltd. | X-22-1821 |  |  |  |  |
|  |  | Fluorine-modified | Shin-Etsu Chemical Co., Ltd. | X-22-821 |  |  |  |  |
|  |  | Polyether-modified | Shin-Etsu Chemical Co., Ltd. | X-22-2516 |  |  |  |  |
|  |  | Carboxyl-modified | Shin-Etsu Chemical Co., Ltd. | X-22-3710 |  |  |  |  |
|  |  | Phthalocyanine blue |  |  |  |  |  | 20 |
|  |  | Dipentaerythritol hexaacrylate |  |  |  |  |  | 25 |
|  |  | Trimethylolpropane acrylate |  |  |  |  |  | 15 |
| Evaluation item | Gravure printability |  |  |  | x | ○ | ○ | x |
|  | Curability (surface tack) |  |  |  | x | x | x | x |
|  | Adhesiveness |  |  |  | x | x | ○ | x |
|  | Chemical resistance |  |  |  | — | — | ○ | — |
|  | Crumpling resistance |  |  |  | — | — | ○ | — |
|  | Scratch resistance |  |  |  | — | — | ○ | — |
|  | Suitability for shrinking |  |  |  | — | — | ○ | — |

INDUSTRIAL APPLICABILITY

The coating compositions for plastic labels according to the present invention have low viscosities and are thereby satisfactorily applied to plastic films by coating through gravure printing and flexographic printing. They cure rapidly to contribute to more efficient production of plastic labels. Additionally, they adhere to plastic films satisfactorily to give, after curing, coating layers that satisfactorily follow deformation of base films upon shrinking process and excel in chemical resistance, scratch resistance, and crumpling resistance. The coating compositions according to the present invention are therefore particularly useful typically as printing inks for plastic labels. The application of these coating compositions give plastic labels that are particularly useful as labels for use in glass bottles, plastic containers such as PET bottles, and metal containers such as bottle cans.

The invention claimed is:

1. A shrink label comprising:
 a plastic film; and
 a coating layer formed from an active energy ray-curable coating composition, on at least one surface of the plastic film, the active energy ray-curable coating composition comprising:
 an oxetane compound as Component A;
 an epoxy compound as Component B; and
 at least one of a cyclic acetal and a poly(vinyl butyral) as Component C;
 wherein the weight ratio of Component A to Component B is from 2:8 to 8:2; the active energy ray-curable coating composition contains from 0.1 to 30 parts by weight of Component C per 100 parts by weight of the total amount of Component A and Component B; and
 the plastic film is a uniaxially oriented film or a biaxially oriented film.

2. The shrink label of claim 1, wherein the weight ratio of Component A to Component B is from 4:6 to 8:2.

3. The shrink label of claim 1, wherein the active energy ray-curable coating composition contains from 0.5 to 25 parts by weight of Component C per 100 parts by weight of the total amount of Component A and Component B.

4. The shrink label of claim 1, wherein Component C is cyclic acetal.

5. The shrink label of claim 4, wherein the cyclic acetal is 1,3-dioxolane or 1,4-dioxane.

6. The shrink label of claim 1, wherein Component C is poly(vinyl butyral).

7. The shrink label of claim 1, wherein the coating layer is formed by gravure printing or flexographic printing.

8. The shrink label of claim 1, wherein the plastic film is a polyester film, a polyolefin film, a polystyrene film, or a poly(vinyl chloride) film.

9. The shrink label of claim 1, wherein the active energy ray-curable coating composition further comprises a silicone compound.

10. The shrink label of claim 9, wherein the active energy ray-curable coating composition contains from 0.1 to 20 parts by weight of the silicone compound per 100 parts by weight of the total amount of Component A and Component B.

11. The shrink label of claim 1, wherein the active energy ray-curable coating composition further comprises a sensitizer and titanium oxide.

12. The shrink label of claim 1, wherein the active energy ray-curable coating layer is an outermost layer.

13. The shrink label of claim 2, wherein the active energy ray-curable coating composition contains from 0.5 to 25 parts by weight of Component C per 100 parts by weight of the total amount of Component A and Component B.

14. The shrink label of claim 2, wherein Component C is cyclic acetal.

15. The shrink label of claim 2, wherein Component C is poly(vinyl butyral).

* * * * *

UNITED STATES PATENT AND TRADEMARK OFFICE
CERTIFICATE OF CORRECTION

PATENT NO.       : 8,486,515 B2  
APPLICATION NO. : 12/087001  
DATED            : July 16, 2013  
INVENTOR(S)      : Ishida et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this
Eighth Day of September, 2015

Michelle K. Lee
*Director of the United States Patent and Trademark Office*